(12) United States Patent
Dunjic et al.

(10) Patent No.: US 11,983,690 B2
(45) Date of Patent: *May 14, 2024

(54) SYSTEM AND METHOD FOR REAL-TIME TRANSFER PROTOCOL DETERMINATION

(71) Applicant: The Toronto-Dominion Bank, Toronto (CA)

(72) Inventors: Milos Dunjic, Oakville (CA); David Samuel Tax, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/159,714

(22) Filed: Jan. 26, 2023

(65) Prior Publication Data
US 2023/0169484 A1    Jun. 1, 2023

Related U.S. Application Data

(63) Continuation of application No. 17/377,846, filed on Jul. 16, 2021, now Pat. No. 11,593,784.

(51) Int. Cl.
*G06Q 20/22* (2012.01)
*G06Q 20/10* (2012.01)

(52) U.S. Cl.
CPC ......... *G06Q 20/223* (2013.01); *G06Q 20/102* (2013.01)

(58) Field of Classification Search
None
See application file for complete search history.

(56) References Cited

U.S. PATENT DOCUMENTS

| 8,600,898 B2 | 12/2013 | Gilder et al. |
| 9,436,955 B2 | 9/2016 | Dorsey et al. |
| 9,691,102 B2 | 6/2017 | Studnitzer et al. |
| 2016/0132884 A1* | 5/2016 | Fridman ............... G06Q 30/00 705/40 |
| 2017/0140371 A1 | 5/2017 | Forzley et al. |
| 2018/0315051 A1 | 11/2018 | Hurley et al. |

FOREIGN PATENT DOCUMENTS

AU    2020100990 A4    7/2020

* cited by examiner

*Primary Examiner* — Scott S Trotter
*Assistant Examiner* — Amit Patel
(74) *Attorney, Agent, or Firm* — Rowand LLP

(57) ABSTRACT

A server computer system, comprises a processor; a communications module coupled to the processor; and a memory coupled to the processor, the memory storing instructions that, when executed, configure the processor to receive, via a user interface displayed on a client device, a signal including a request to transfer data; identify, based on the request to transfer data, a particular data record for receiving the data; determine, based on the particular data record, that a real-time transfer protocol is available to complete the transfer; and in response to determining that the real-time transfer protocol is available to complete the transfer, send, to the client device, a signal enabling a selectable option on the user interface to complete the transfer using the real-time transfer protocol.

23 Claims, 11 Drawing Sheets

US 11,983,690 B2

SYSTEM AND METHOD FOR REAL-TIME TRANSFER PROTOCOL DETERMINATION

CROSS-REFERENCE TO RELATED APPLICATIONS

This application is a continuation of U.S. patent application Ser. No. 17/377,846, filed on Jul. 29, 2021, the entire contents of which are incorporated herein by reference.

TECHNICAL FIELD

The present disclosure relates to systems and methods for real-time transfer protocol determination.

BACKGROUND

Transfer protocols may be used to transfer data between data records. Multiple transfer protocols may be available to complete the transfer however this may be unknown to the party initiating the data transfer. As such, the data transfer may be completed using a transfer protocol that is undesirable.

BRIEF DESCRIPTION OF THE DRAWINGS

Reference will now be made, by way of example, to the accompanying drawings which show example embodiments of the present application and in which.

Like reference numerals are used in the drawings to denote like elements and features.

DETAILED DESCRIPTION OF EXAMPLE EMBODIMENTS

Figure 1:
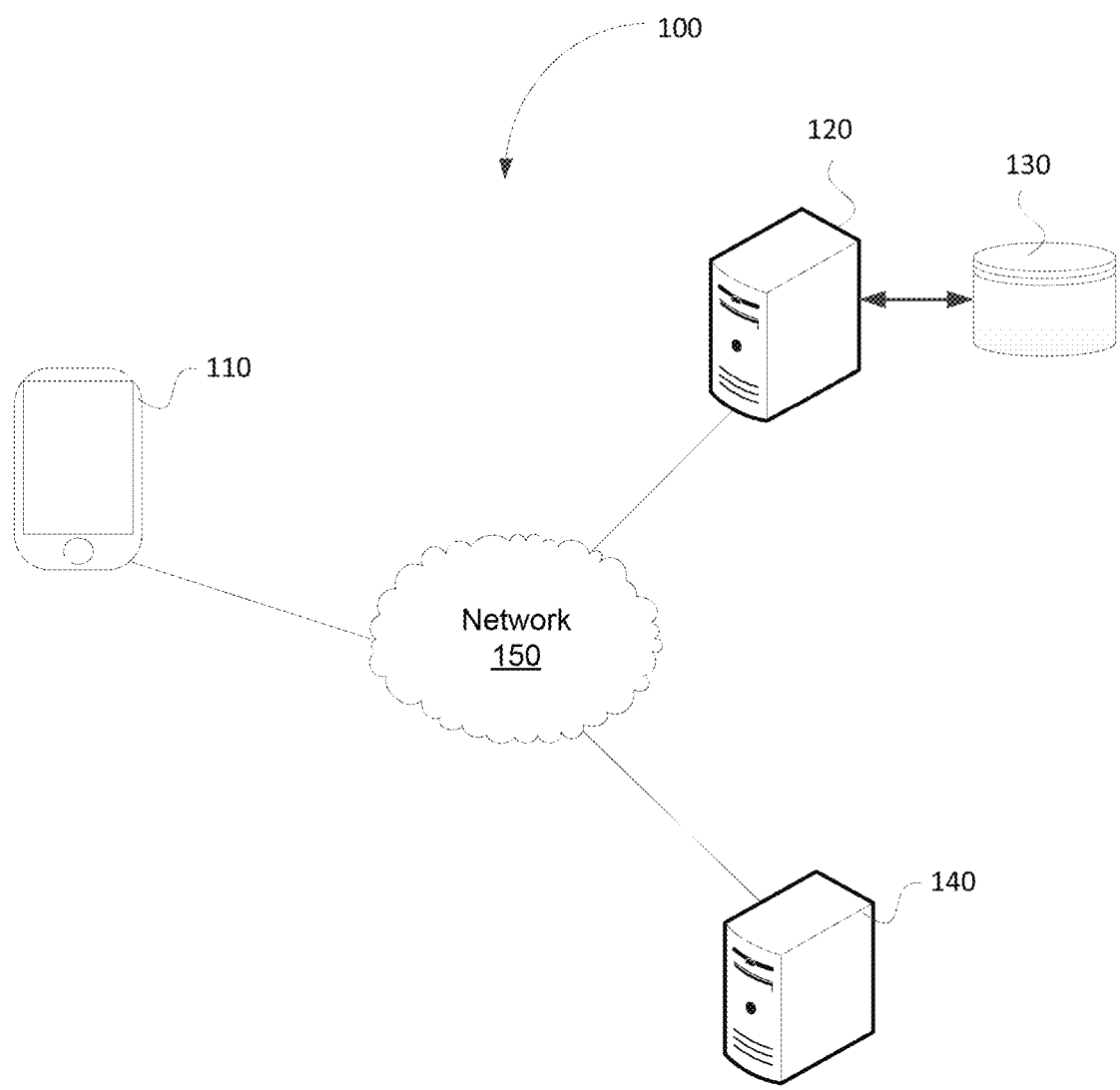
FIG. 1 is a schematic diagram illustrating an operating environment of an example embodiment.

Accordingly, in an aspect there is provided a server computer system, comprising a processor; a communications module coupled to the processor; and a memory coupled to the processor, the memory storing instructions that, when executed, configure the processor to receive, via a user interface displayed on a client device, a signal including a request to transfer data; identify, based on the request to transfer data, a particular data record for receiving the data; determine, based on the particular data record, that a real-time transfer protocol is available to complete the transfer; and in response to determining that the real-time transfer protocol is available to complete the transfer, send, to the client device, a signal enabling a selectable option on the user interface to complete the transfer using the real-time transfer protocol.

In one or more embodiments, the instructions, when executed, further configure the processor to receive, from the client device, a signal indicating selection of the selectable option to complete the transfer using the real-time transfer protocol; and responsive to receiving the signal indicating selection of the selectable option to complete the transfer using the real-time transfer protocol, transfer the data to the particular data record using the real-time transfer protocol.

In one or more embodiments, the instructions, when executed, further configure the processor to determine that the transfer of the data to the particular data record using the real-time transfer protocol has completed; and responsive to determining that the transfer of the data to the particular data record using the real-time transfer protocol has completed, update a database to indicate that the real-time transfer protocol is available for an institution associated with the particular data record.

In one or more embodiments, identifying the particular data record for receiving the data includes identifying an institution associated with the particular data record.

In one or more embodiments, determining that the real-time transfer protocol is available to complete the transfer includes sending, to a database, a signal requesting confirmation that the real-time transfer protocol is available to complete the transfer to the particular data record.

In one or more embodiments, determining that the real-time transfer protocol is available to complete the transfer includes transferring a nominal value to the particular data record using the real-time transfer protocol and monitoring the transfer of the nominal value to the particular data record using the real-time transfer protocol for completion and the instructions, when executed, further configure the processor to determine that the transfer of the nominal value to the particular data record using the real-time transfer protocol has completed; and responsive to determining that the transfer of the nominal value to the particular data record using the real-time transfer protocol has completed, update a database to indicate that the real-time transfer protocol is available for an institution associated with the particular data record.

In one or more embodiments, determining that the real-time transfer protocol is available to complete the transfer includes transferring a first nominal value using the real-time transfer protocol and transferring a second nominal value using a non-real-time transfer protocol and comparing a settlement time for the transfer of the first nominal value to a settlement time for the transfer of the second nominal value and the instructions, when executed, further configure the processor to determine that the settlement time for the first nominal value is before the settlement time for the second nominal value; and responsive to determining that the settlement time for the first nominal value is before the settlement time for the second nominal value, update a database to indicate that the real-time transfer protocol is available for an institution associated with the particular data record.

In one or more embodiments, determining that the real-time transfer protocol is available to complete the transfer includes crawling a website to identify keywords suggesting availability of the real-time transfer protocol for an institution associated with the particular data record and the instructions, when executed, further configure the processor to determine that crawling the web site to identify the keywords suggests the availability of the real-time protocol for the institution associated with the particular data record; and responsive to determining that crawling the website to identify the keywords suggests the availability of the real-time transfer protocol for the institution associated with the particular data record, update a database to indicate that the real-time transfer protocol is available for an institution associated with the particular data record.

In one or more embodiments, determining that the real-time transfer protocol is available to complete the transfer is based on a database that includes a score for institutions and the instructions, when executed, further configure the processor to update the database based on past transfers to adjust the score for one of the institutions when it is determined that a transfer successfully completed using the real-time transfer protocol.

In one or more embodiments, determining that the real-time transfer protocol is available to complete the transfer includes determining that the score for an institution associated with the particular data record exceeds a threshold.

According to another aspect there is provided a method comprising receiving, via a user interface displayed on a client device, a signal including a request to transfer data; identifying, based on the request to transfer data, a particular data record for receiving the data; determining, based on the particular data record, that a real-time transfer protocol is available to complete the transfer; and in response to determining that the real-time transfer protocol is available to complete the transfer, sending, to the client device, a signal enabling a selectable option on the user interface to complete the data transfer using the real-time transfer protocol.

In one or more embodiments, the method further comprises receiving, from the client device, a signal indicating selection of the selectable option to complete the transfer using the real-time transfer protocol; and responsive to receiving the signal indicating selection of the selectable option to complete the transfer using the real-time transfer protocol, transferring the data to the particular data record using the real-time transfer protocol.

In one or more embodiments, the method further comprises determining that the transfer of the data to the particular data record using the real-time transfer protocol has completed; and responsive to determining that the transfer of the data to the particular data record using the real-time transfer protocol has completed, updating a database to indicate that the real-time transfer protocol is available for an institution associated with the particular data record.

In one or more embodiments, identifying the particular data record for receiving the data includes identifying an institution associated with the particular data record.

In one or more embodiments, determining that the real-time transfer protocol is available to complete the transfer includes sending, to a database, a signal requesting confirmation that the real-time transfer protocol is available to complete the transfer to the particular data record.

In one or more embodiments, determining that the real-time transfer protocol is available to complete the transfer includes transferring a nominal value to the particular data record using the real-time transfer protocol and monitoring the transfer of the nominal value to the particular data record using the real-time transfer protocol for completion and the method further comprises determining that the transfer of the nominal value to the particular data record using the real-time transfer protocol has completed; and responsive to determining that the transfer of the nominal value to the particular data record using the real-time transfer protocol has completed, updating a database to indicate that the real-time transfer protocol is available for an institution associated with the particular data record.

In one or more embodiments, determining that the real-time transfer protocol is available to complete the transfer includes transferring a first nominal value using the real-time transfer protocol and transferring a second nominal value using a non-real-time transfer protocol and comparing a settlement time for the transfer of the first nominal value to a settlement time for the transfer of the second nominal value and the method further comprises determining that the settlement time for the first nominal value is before the settlement time for the second nominal value; and responsive to determining that the settlement time for the first nominal value is before the settlement time for the second nominal value, updating a database to indicate that the real-time transfer protocol is available for an institution associated with the particular data record.

In one or more embodiments, determining that the real-time transfer protocol is available to complete the transfer includes crawling a website to identify keywords suggesting availability of the real-time transfer protocol for an institution associated with the particular data record and the method further comprises determining that crawling the website to identify the keywords suggests the availability of the real-time transfer protocol for the institution associated with the particular data record; and responsive to determining that crawling the website to identify the keywords suggests the availability of the real-time transfer protocol for the institution associated with the particular data record, updating a database to indicate that the real-time transfer protocol is available for an institution associated with the particular data record.

In one or more embodiments, determining that the real-time transfer protocol is available to complete the transfer is based on a database that includes a score for institutions and wherein the method further includes updating the database based on past transfers to adjust the score for one of the institutions when it is determined that a transfer successfully completed using the real-time transfer protocol.

According to another aspect there is provided a non-transitory computer readable storage medium comprising processor-executable instructions which, when executed, configure a processor to receive, via a user interface displayed on a client device, a signal including a request to transfer data; identify, based on the request to transfer data, a particular data record for receiving the data; determine, based on the particular data record, that a real-time transfer protocol is available to complete the transfer; and in response to determining that the real-time transfer protocol is available to complete the transfer, send, to the client device, a signal enabling a selectable option on the user interface to complete the data transfer using the real-time transfer protocol.

Other example embodiments of the present disclosure will be apparent to those of ordinary skill in the art from a review of the following detailed descriptions in conjunction with the drawings.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

FIG. 1 illustrates an exemplary system 100 consistent with certain disclosed embodiments. As shown in FIG. 1, the system 100 may include a client device 110, a server computer system 120, a database 130 associated with the server computer system 120, a transfer protocol server 140, and a network 150 connecting one or more of the components of the system 100.

The client device 110 may be a computing device. The client device 110 may take a variety of forms including, for example, a mobile communication device such as a smartphone, a tablet computer, a wearable computer (such as a head-mounted display or smartwatch), a laptop or desktop computer, or a computing device of another type. The client device 110 may be associated with a client entity (e.g., an individual, an organization, etc.) having resources that are managed by or via the server computer system 120. For example, the server computer system 120 may be a financial institution server and the client entity may be a customer of a financial institution operating the financial institution server. The client device 110 may store software instructions that cause the client device 110 to establish communications with the server computer system 120.

The server computer system 120 may maintain a database that includes various data records. For example, the server computer system 120 may be a financial institution server which may maintain customer bank accounts. In this example, a data record may, for example, reflect an amount of value stored in a particular account associated with a user. The amount of value may include a quantity of currency.

The server computer system 120 maintains the database 130. The database 130 may include data records and at least some of the data records may be associated with identifying one or more institutions and indications as to whether or not the one or more institutions support one or more transfer protocols. For example, at least some of the data records may be in the form of a look-up table that may be used to identify whether or not a particular institution supports one or more transfer protocols. The server computer system 120 may communicate signals to the database 130 to update the one or more data records to indicate whether or not a particular institution supports one or more transfer protocols. The server computer system 120 may additionally communicate signals to the database 130 to update the one or more data records to add one or more institutions thereto and to indicate whether or not the added one or more institutions support one or more transfer protocols.

The database 130 may be accessed by one or more third party servers (not shown). For example, the server computer system 120 may provide an application programming interface (API) that may be used by one or more third party servers to access the database 130. The one or more third party servers may have read-only access to the database 130 via the API.

The transfer protocol server 140 may facilitate transfers between data records using one or more transfer protocols. A data transfer request may include a request to transfer data from a first data record maintained by the server computer system 120 to a second data record maintained by a third party server computer system. For example, the server computer system 120 may send a signal to the transfer protocol server 140 that includes a request to transfer data to a particular data record maintained by a particular institution. The transfer protocol server 140 may analyze the request to identify which transfer protocol is to be used and may complete the data transfer using the identified transfer protocol. In this embodiment, the transfer protocol server 140 may be configured to complete data transfers using one or more transfer protocols. In another embodiment, multiple transfer protocol servers may be used where each transfer protocol server is configured to complete data transfers using a particular transfer protocol. The transfer protocol server 140 may be associated with a third party that is different than the institution associated with the server computer system 120.

The client device 110, the server computer system 120 and the transfer protocol server 140 may be in geographically disparate locations. Put differently, the client device 110 may be remote from the server computer system 120 and/or the transfer protocol server 140.

The network 150 is a computer network. In some embodiments, the network 150 may be an internetwork such as may be formed of one or more interconnected computer networks. For example, the network 150 may be or may include an Ethernet network, an asynchronous transfer mode (ATM) network, a wireless network, or the like.

Figure 2A:
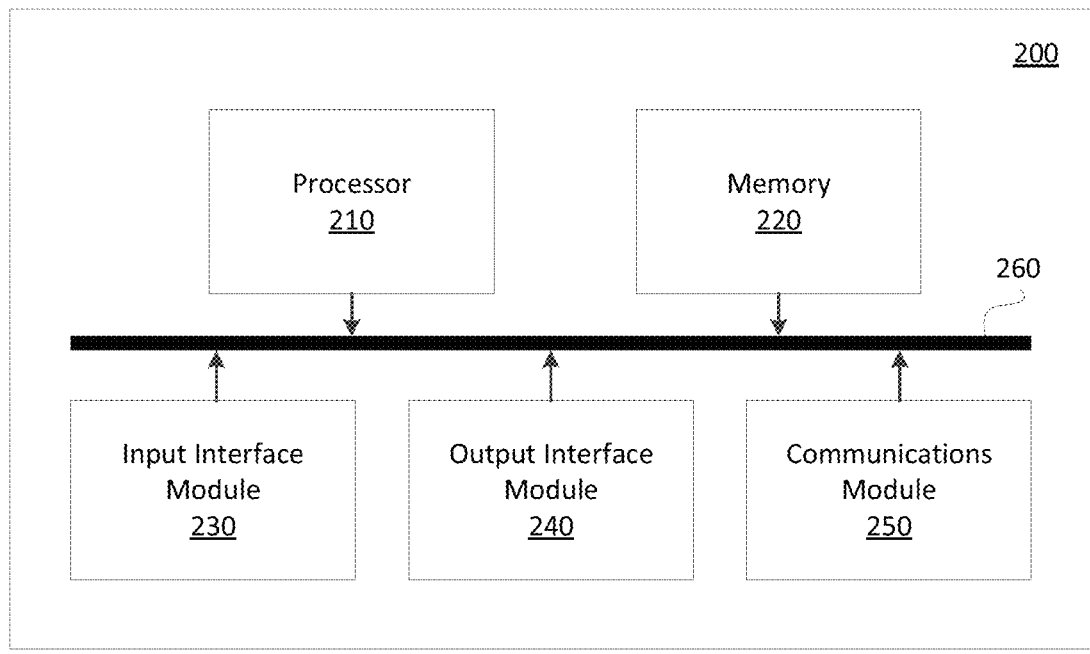
FIG. 2A is a high-level schematic diagram of an example computing device.

FIG. 2A is a high-level operation diagram of an example computing device 200. In some embodiments, the example computing device 200 may be exemplary of one or more of the client device 110, the server computer system 120 and the transfer protocol server 140. The example computing device 200 includes a variety of modules. For example, as illustrated, the example computing device 200, may include a processor 210, a memory 220, an input interface module 230, an output interface module 240, and a communications module 250. As illustrated, the foregoing example modules of the example computing device 200 are in communication over a bus 260.

The processor 210 is a hardware processor. Processor 210 may, for example, be one or more ARM, Intel x86, PowerPC processors, or the like.

The memory 220 allows data to be stored and retrieved. The memory 220 may include, for example, random access memory, read-only memory, and persistent storage. Persistent storage may be, for example, flash memory, a solid-state drive, or the like. Read-only memory and persistent storage are a computer-readable medium. A computer-readable medium may be organized using a file system such as may be administered by an operating system governing overall operation of the example computing device 200.

The input interface module 230 allows the example computing device 200 to receive input signals. Input signals may, for example, correspond to input received from a user. The input interface module 230 may serve to interconnect the example computing device 200 with one or more input devices. Input signals may be received from input devices by the input interface module 230. Input devices may, for example, include a touchscreen input, keyboard, trackball, or the like. In some embodiments, all or a portion of the input interface module 230 may be integrated with an input device. For example, the input interface module 230 may be integrated with one of the aforementioned example input devices.

The output interface module 240 allows the example computing device 200 to provide output signals. Some output signals may, for example, allow provision of output to a user. The output interface module 240 may serve to interconnect the example computing device 200 with one or more output devices. Output signals may be sent to output devices by output interface module 240. Output devices may include, for example, a display screen such as, for example, a liquid crystal display (LCD), a touchscreen display. Additionally, or alternatively, output devices may include devices other than screens such as for example a speaker, indicator lamps (such as for example light-emitting diodes (LEDs)), and printers. In some embodiments, all or a portion of the output interface module 240 may be integrated with an output device. For example, the output interface module 240 may be integrated with one of the aforementioned example output devices.

The communications module 250 allows the example computing device 200 to communicate with other electronic devices and/or various communications networks. For example, the communications module 250 may allow the example computing device 200 to send or receive communications signals. Communications signals may be sent or received according to one or more protocols or according to one or more standards. For example, the communications module 250 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 250 may allow the example computing device 200 to communicate using near-field communication (NFC), via Wi-Fi™, using Bluetooth™ or via some combination of one or more networks or protocols. Contactless payments may be made using NFC. In some embodiments, all or a portion of the communications module 250 may be integrated into a component of the example computing device 200. For example, the communications module may be integrated into a communications chipset.

Software comprising instructions is executed by the processor 210 from a computer-readable medium. For example, software may be loaded into random-access memory from persistent storage of memory 220. Additionally, or alternatively, instructions may be executed by the processor 210 directly from read-only memory of memory 220.

Figure 2B:
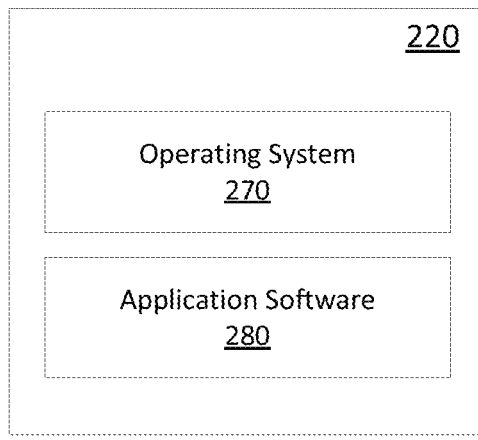
FIG. 2B is a schematic block diagram showing a simplified organization of software components stored in memory of the example computing device of FIG. 2A.

FIG. 2B depicts a simplified organization of software components stored in memory 220 of the example computing device 200. As illustrated these software components include an operating system 270 and application software 280.

The operating system 270 is software. The operating system 270 allows the application software 280 to access the processor 210, the memory 220, the input interface module 230, the output interface module 240 and the communications module 250. The operating system 270 may be, for example, Apple iOS™, Google Android™, Linux™, Microsoft Windows™, or the like.

The application software 280 adapts the example computing device 200, in combination with the operating system 270, to operate as a device performing particular functions. In some embodiments, the application software 280 may include a resource management application. The resource management application may, for example, be a personal banking application that enables users to perform various actions for managing their bank accounts using a personal computing device (e.g., laptop, mobile phone, etc.).

Through the resource management application, the server computer system 120 may provide a user interface that is displayed on a display screen of the client device 110. The user interface may include one or more fields that may be completed by a user of the client device 110 to initiate a transfer of data.

The server computer system 120 may require information relating to the transfer of data such as for example information identifying a recipient of the data and as such the user may complete the one or more fields to provide this information to the server computer system 120. The information identifying the recipient of the data may include, for example, an email address or a telephone number of the recipient of the data, an account number identifying a data record associated with the recipient of the data, etc. In embodiments where the information identifying the recipient of the data includes the email address or the telephone number of the recipient, the server computer system 120 may use this information to identify a particular data record for receiving the data. For example, the server computer system 120 may send a signal to a third party server that includes the email address or the telephone number of the recipient of the data and requesting an account number identifying a data record associated with the recipient.

The server computer system 120 may require information relating to the type or amount of data that is to be transferred and as such the user may complete the one or more fields to provide this information to the server computer system 120. The request to transfer data may be a request to transfer computing resources or data. The request to transfer data may be a request to transfer resources such as for example an amount of value. The amount of value may include, for example, a quantity of currency. The server computer system 120 may additionally require, for example, a type of currency that is to be transferred.

The server computer system 120 may determine whether or not a real-time transfer protocol is available to complete the data transfer. The real-time transfer protocol may include a real-time payment rail. The real-time payment rail may be hosted by a real-time payment system that includes a real-time payment server.

In at least some embodiments, the real-time payment system is associated with a third-party and is configured to receive a data transfer request. The data transfer request may include a request to transfer data from a first data record to a second data record. The first data record may include a data record associated with a sender and the second data record may include a data record associated with a receiver. The first data record may be associated with a first financial institution and the second data record may be associated with a second financial institution.

The request to transfer data may be a request to transfer resources such as for example an amount of value. The amount of value may include a quantity of currency. The sender may initiate the data transfer request using, for example, a computing device.

The data transfer request may be formatted as an ISO 20022 message and may include one or more parameters. The ISO 20022 format is a data-rich messaging format that provides the real-time data transfer rail with a clear and nuanced format of data. The one or more parameters may be included as metadata in the data transfer request. The one or more parameters may include resource definition data. The resource definition data defines what is requested to be transferred. By way of example, the resource definition data may define a resource that is stored in or otherwise associated with a data record associated with the sender. The resource may represent an amount of value, such as a quantity of a currency. Since the ISO 20022 format is a data-rich messaging format that provides the real-time data transfer rail with a clear and nuanced format of data, the likelihood of errors and thus processing delays is minimized and as a result the real-time payment rail is able to facilitate data transfers in real-time.

Responsive to receiving the data transfer request, the real-time payment system may complete the data transfer request using the real-time payment rail. Specifically, the real-time payment server is configured to receive the data transfer request and to facilitate the data transfer from the first data record associated with the sender to the second data record associated with the receiver in real-time. In at least some embodiment, the data transfer is irrevocable, that is, the sender cannot retrieve the data transfer after it has been sent.

The real-time payment rail is able to complete data transfer requests in real-time or near real-time. In at least some embodiments, real-time is defined as being within seconds. In at least some embodiments, real-time may be limited by network traffic.

It will be appreciated that the real-time payment rail is available 24×7×365, that is, twenty four (24) hours a day, seven (7) days a week, and three hundred and sixty five (365) days per year.

Figure 3:
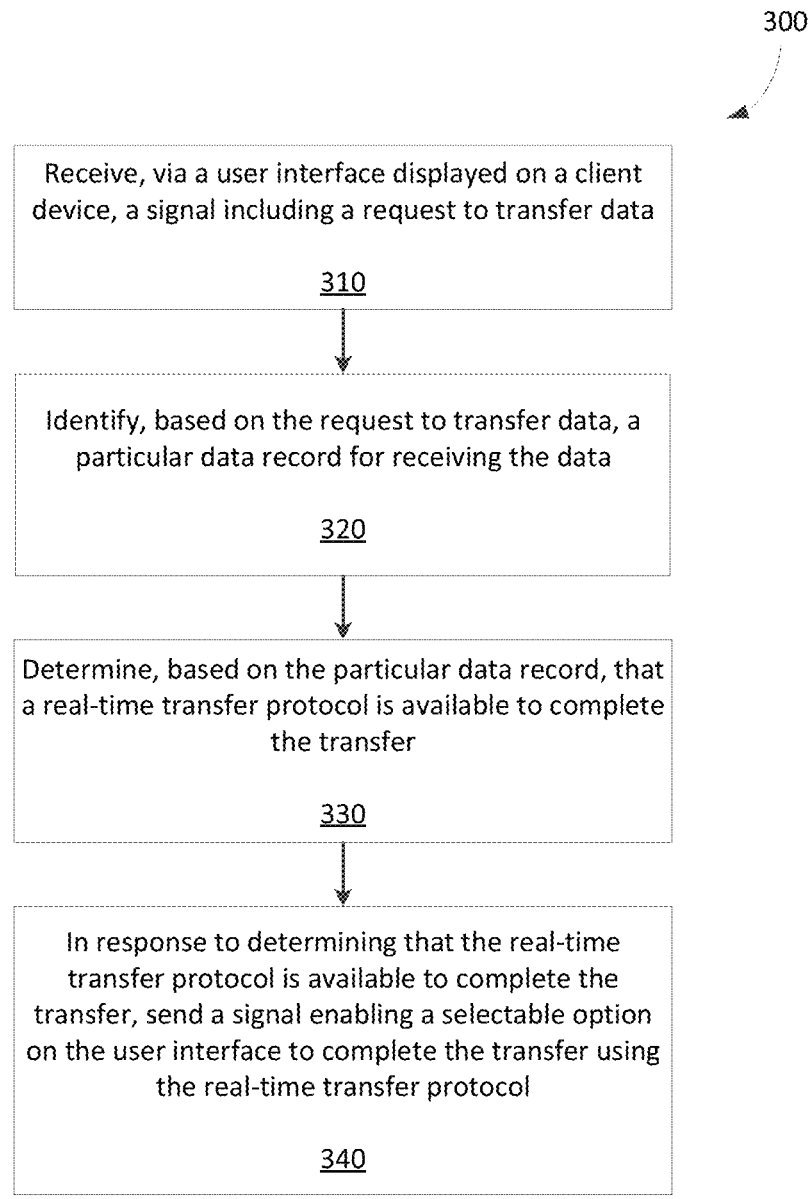
FIG. 3 shows, in flowchart form, an example method for real-time transfer protocol determination.

Reference is made to FIG. 3, which illustrates, in flowchart form, a method 300 for real-time message protocol determination. The method 300 may be implemented by a computing device having suitable processor-executable instructions for causing the computing device to carry out the described operations. The method 300 may be implemented, in whole or in part, by the server computer system 120. The server computer system 120 may off-load some operations of the method 300 to the client device 110 and/or the transfer protocol server 140 (FIG. 1).

The method 300 includes receiving, via a user interface displayed on a client device, a signal including a request to transfer data (step 310).

As mentioned, the request to transfer data may be a request to transfer computing resources or data. As an example, the request to transfer data may be a request to transfer data between nodes of a network. As another example, the request to transfer data may be a request to deliver data such as audio or video over an interne protocol (IP) network. As another example, the request to transfer data may be a request to transfer resources such as for example an amount of value. The amount of value may include, for example, a quantity of currency. The server computer system 120 may additionally require, for example, a type of currency that is to be transferred.

The request to transfer data may be a request to transfer data using, for example, a non-real-time protocol. For example, the request to transfer data may be a request to transfer data using a non-real time Internet Protocol (IP) standard. As another example, the request to transfer data may be an e-transfer request.

The request to transfer data may include information identifying a recipient. For example, where the request to transfer data is a request to transfer computing resources, the request to transfer data may include an IP address of a node associated with the recipient. As another example, where the request to transfer data is an e-transfer request, the request to transfer data may include an email address or a telephone number of the recipient.

The method 300 includes identifying, based on the request to transfer data, a particular data record for receiving the data (step 320).

In embodiments where the data to be transferred includes computing resources, the particular data record for receiving the data may be identified based on, for example, a web address, an IP address, etc. In at least some embodiments, the particular data record may include or may be associated with a node of a network. For example, the data transfer may be a node-to-node data transfer wherein data is transferred from one node of a network to the next. The node-to-node data transfer may be according to the Open Systems Interconnection (OSI) model.

In embodiments where the data to be transferred includes resource data, the request to transfer data may include information identifying the recipient. For example, the request to transfer data may include an email address or a telephone number of the recipient. In one or more embodiments, the information identifying the recipient may be used to identify a particular record for receiving the data.

Figure 4:
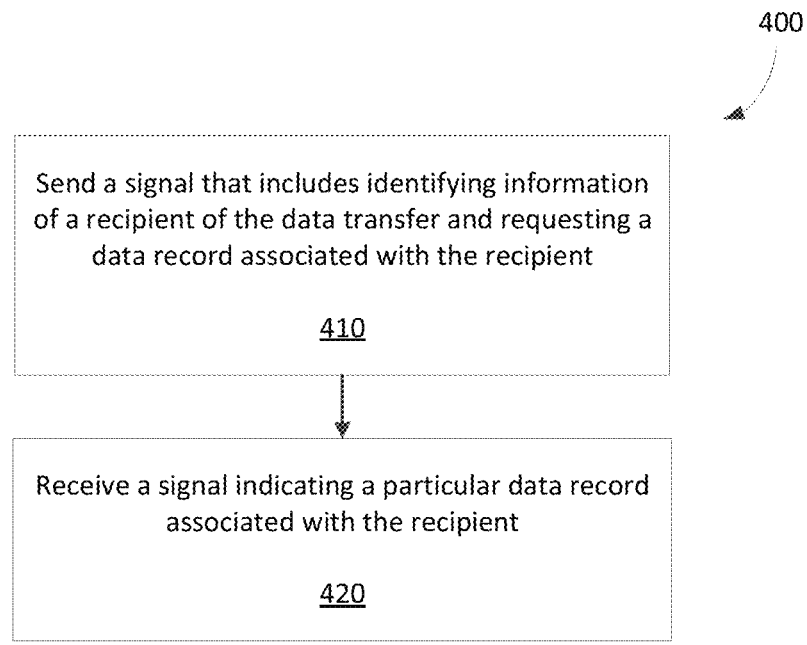
FIG. 4 shows, in flowchart form, an example method for identifying a particular data record for receiving the data.

Reference is made to FIG. 4 which illustrates, in flowchart form, a method 400 for identifying a particular data record for receiving the data. The method 400 may be implemented by a computing device having suitable processor-executable instructions for causing the computing device to carry out the described operations. The method 400 may be implemented, in whole or in part, by the server computer system 120. The server computer system 120 may off-load some operations of the method 400 to the client device 110 and/or the transfer protocol server 140 (FIG. 1).

The method 400 includes sending a signal that includes identifying information of a recipient of the data transfer and requesting a data record associated with the recipient (step 410).

In this embodiment, the signal may be sent to one of a database and a third party server. For example, the server computer system 120 may send the signal to a database associated therewith to determine if the recipient has a data record maintained by the institution associated with the server computer system 120. Put another way, the server computer system 120 may perform a check to determine if the recipient is a customer that has an account at the institution of the server computer system 120.

Responsive to receiving the signal, the database may perform a lookup using the identifying information of the recipient to determine whether or not the recipient has a data record maintained thereby. Responsive to determining that the recipient has a data record maintained by the institution associated with the server computer system 120, the database may generate a signal that indicates a particular data record associated with the recipient.

Responsive to determining that the recipient does not have a data record maintained by the institution associated with the server computer system 120, the server computer system 120 may send a signal to a third party server that includes the identifying information of the recipient of the data transfer and requesting a data record associated with the recipient. In this embodiment, the third party server may be associated with an institution such as for example an interbank network that links financial institutions and other enterprises for the purposes of exchanging electronic financial transactions and/or an institution that conducts funds transfers such as for example e-transfers. The third party server may be the transfer protocol server 140.

The third party server may maintain a database that associates email addresses with data records. For example, the database may include a list of email addresses for users that have signed up for a service hosted by the third party server and that includes information identifying a data record associated with each email address. The service may be, for example, an automatic deposit service.

Responsive to receiving the signal, the third party server may perform a lookup using the identifying information of the recipient to identify or determine a particular data record of the recipient. Responsive to identifying the particular data record of the recipient, the third party server may generate a signal that indicates a particular data record associated with the recipient.

The particular data record may be identified using, for example, a bank account number that includes a routing number, a transit number and an account number. The routing number may include a five (5) digit transit number identifying a branch where an account is held. The transit number may include a three (3) digit institution number corresponding to an institution associated with the account. The account number may identify the account and may include between seven (7) and twelve (12) digits, for example. The particular data record may additionally or alternatively be identified using, for example, an International Bank Account Number (IBAN) or any other standard that may be validated using a specially programmed computing device.

The method 400 includes receiving a signal indicating a particular data record associated with the recipient (step 420).

The signal sent from the database or the third party server is received by the computer server system 120. As mentioned, the particular data record may be identified using a bank account number and/or an IBAN. As such, the server computer system 120 receives a signal that indicates the particular data record associated with the recipient.

Turning back to FIG. 3, the method 300 includes determining, based on the particular data record, that a real-time transfer protocol is available to complete the transfer (step 330).

In embodiments where the data to be transferred includes computing resources, the server computer system 120 may determine that the real-time transfer protocol is available based on, for example, the web address or IP address of the particular data record. For example, the server computer system 120 may determine that a node associated with the particular data record may be connected to a network that supports real-time transfer protocols such as for example the Secure Real-Time Transport Protocol (SRTP). Put another way, it may be determined that the network is able to support the encryption, message authentication, integrity and replay attack protection required by the SRTP and as a result the server computer system 120 determines that the real-time transfer protocol is available to complete the transfer.

In embodiments where the data to be transferred includes resource data, the server computer system 120 may determine that the real-time transfer protocol is available based on, for example, information identifying the particular data record. For example, the information identifying the particular data record may be analyzed by the server computer system 120 to determine that the real-time transfer protocol is available. For example, in embodiments where the particular data record is a data record hosted by the server computer system 120, the server computer system 120 determines whether or not the real-time transfer protocol is available based on whether or not the institution associated therewith supports the real-time transfer protocol.

In embodiments where the particular data record is hosted by a different institution than that associated with the server computer system 120, the information identifying the particular data record may be used by the server computer system 120 to determine that the real-time transfer protocol is available. Specifically, when identifying the particular data record for receiving the data, the server computer system 120 may analyze the information identifying the particular data record to identify an institution associated with the data record. The institution associated with the data record may be obtained from the bank account number or the IBAN.

To determine that the real-time transfer protocol is available to complete the transfer, the server computer system 120 may send a signal to a database requesting confirmation that the real-time transfer protocol is available to complete the transfer to the particular data record. In this embodiment, the database may include the database 130 that includes a look-up table used to identify whether or not a particular institution supports one or more transfer protocols. As such, the signal may identify the institution associated with the data record. Responsive to receiving the signal, the database may perform a look-up of the institution to identify whether or not the institution supports the real-time transfer protocol. When the database determines that the institution associated with the data record supports the real-time transfer protocol, the database may send a signal to the server computer system 120 identifying that the real-time transfer protocol is available to complete the transfer. The signal may be a binary response signal that indicates "YES" when it is determined that the institution supports the real-time transfer protocol. The binary response signal may indicate "NO" when it is determined that the institution does not support the real-time transfer protocol and/or when the institution is not found in the look-up table. In another embodiment, the signal may include a score for the institution. The score may indicate a confidence as to whether or not the institution supports the real-time transfer protocol. The confidence score may be a number between zero (0) and ten (10), where zero indicates no confidence and ten (10) indicates 100% confidence. In this embodiment, the server computer system 120 may compare the confidence score to a threshold to determine if it is likely that the institution supports the real-time transfer protocol. The threshold may be the same for all institutions or may be different based on, for example, the location of the institution and/or a number of data transfers that have been previously completed for the institution using the real-time transfer protocol. For example, if only a single data transfer has been completed using the real-time transfer protocol for a particular institution, then the threshold may be higher than if multiple data transfers have been completed using the real-time transfer protocol for the particular institution.

In one or more embodiments, in determining that the real-time transfer is available to complete the transfer, a method 500 may be performed. The method 500 may be performed, for example, when it is determined that the database does not have information regarding the particular institution associated with the data record. The method 500 may additionally or alternatively be performed periodically and/or randomly to ensure the database maintains an up-to-date list as to whether or not one or more particular institutions support one or more transfer protocols.

Figure 5:
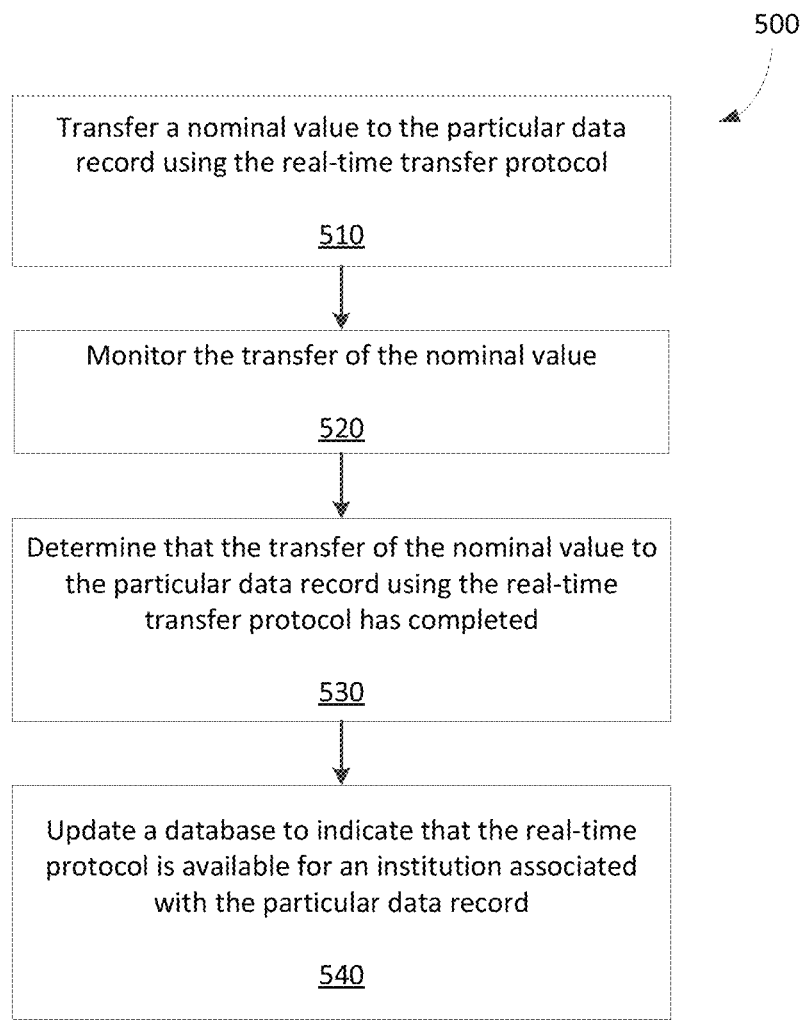
FIG. 5 shows, in flowchart form, an example method for determining real-time transfer protocol availability.

Reference is made to FIG. 5 which illustrates, in flowchart form, the method 500 for determining real-time transfer protocol availability. The method 500 may be implemented by a computing device having suitable processor-executable instructions for causing the computing device to carry out the described operations. The method 500 may be implemented, in whole or in part, by the server computer system 120. The server computer system 120 may off-load some operations of the method 500 to the client device 110 and/or the transfer protocol server 140 (FIG. 1).

The method 500 includes transferring a nominal value to the particular data record using the real-time transfer protocol (step 510).

In at least some embodiments, the data to be transferred includes resource data. In these embodiments, the nominal value may include a small quantity of currency such as for example $0.01. In embodiments where the data to be transferred includes computing resources, the nominal value may include a small quantity of computing resources.

To transfer the nominal value to the particular record, the server computer system 120 may generate a data transfer request and communicate the data transfer request to the transfer protocol server 140. In embodiments where the real-time transfer protocol includes a real-time payment rail, the transfer request may be formatted and encrypted as an ISO 20022 message and may include one or more parameters. The one or more parameters may be included as metadata in the data transfer request. The one or more parameters may include resource definition data that defines the nominal value. The transfer request is sent to the transfer protocol server 140.

Responsive to receiving the data transfer request, the transfer protocol server 140 may attempt to complete the data transfer request using the real-time payment rail. Specifically, the transfer protocol server 140 may receive the data transfer request and facilitate data transfer from a data record associated with the sender to a data record associated with the receiver in real-time. The data transfer may be irrevocable, that is, the sender cannot retrieve the data transfer after it has been sent.

The method 500 includes determining that the transfer of the nominal value to the particular data record using the real-time transfer protocol has completed (step 530).

In this embodiment, the transfer protocol server 140 may send a signal indicating confirmation of the data transfer using the real-time transfer protocol. Since the real-time transfer protocol is able to complete data transfer requests in real-time or near real-time, the server computer system 120 is able to determine that the transfer of the nominal value to the particular data record using the real-time transfer protocol has completed in real-time or near real-time.

The method 500 includes updating a database to indicate that the real-time protocol is available for an institution associated with the particular data record (step 540).

Responsive to determining that the transfer of the nominal value to the particular data record using the real-time transfer protocol has completed, the server computer system 120 may send a signal to the database 130 to update the database to indicate that the real-time protocol is available for the institution associated with the particular data record. In embodiments where the institution is not included in the database 130, the database 130 may update the data records to include the institution. As mentioned, in some embodiments the database may maintain a confidence score and as such the database may update the confidence score based on the signal indicating that the real-time protocol is available for the institution associated with the particular data record.

It will be appreciated that during method 500 it may be determined that the real-time transfer protocol is not available for the institution. For example, responsive to monitoring the transfer of the nominal value using the real-time transfer protocol, such as for example during step 520, it may be determined that the transfer has not completed within a threshold period of time or it may be that a signal is received from the transfer protocol server 140 indicating an error. Responsive to determining that the transfer has not completed within the threshold period of time or responsive to receiving the signal indicating the error, it may be determined that the real-time transfer protocol is not available for the institution. The database may be updated accordingly and this may be done in manners similar to step 540 described herein.

In one or more embodiments, in determining that the real-time transfer is available to complete the transfer, a method 600 may be performed. The method 600 may be performed, for example, when it is determined that the database does not have information regarding the particular institution associated with the data record. The method 600 may additionally or alternatively be performed periodically and/or randomly to ensure the database maintains an up-to-date list as to whether or not one or more particular institutions support one or more transfer protocols.

Figure 6:
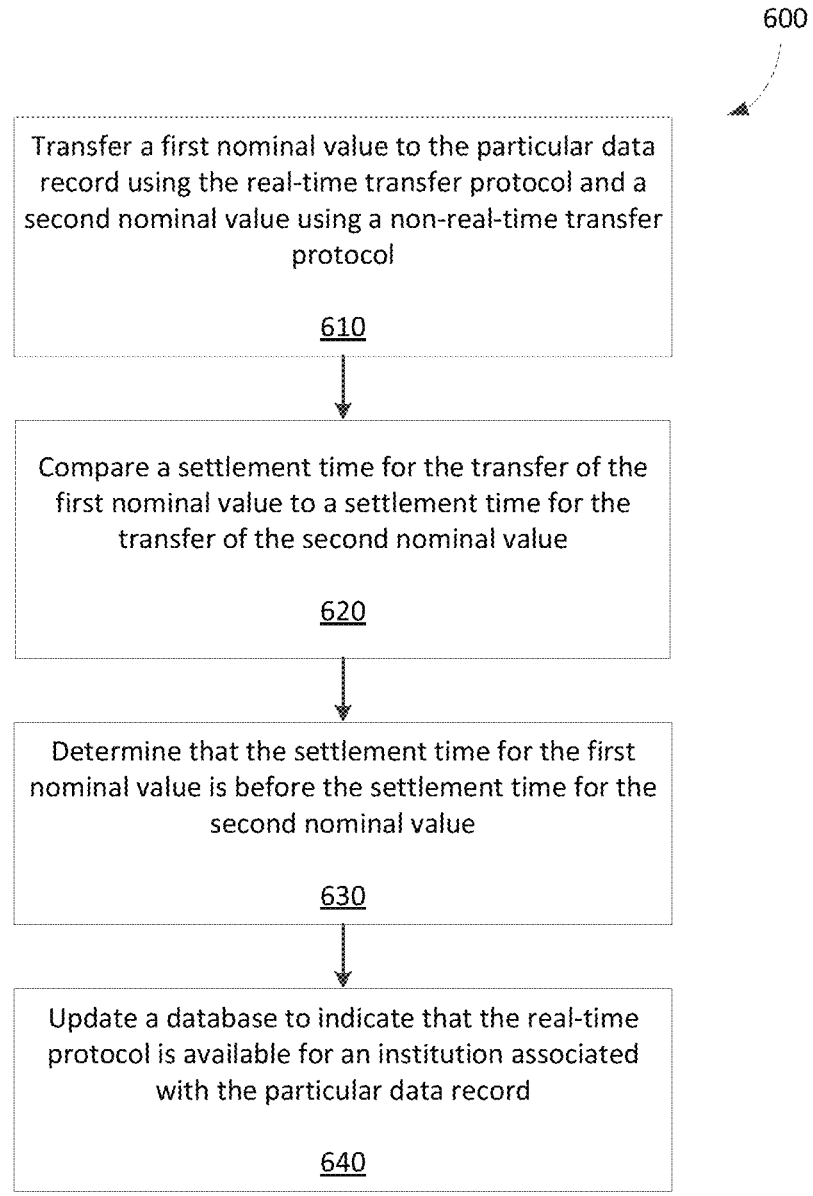
FIG. 6 shows, in flowchart form, another example method for determining real-time transfer protocol availability.

Reference is made to FIG. 6 which illustrates, in flowchart form, the method 600 for determining real-time transfer protocol availability. The method 600 may be implemented by a computing device having suitable processor-executable instructions for causing the computing device to carry out the described operations. The method 600 may be implemented, in whole or in part, by the server computer system 120. The server computer system 120 may off-load some operations of the method 600 to the client device 110 and/or the transfer protocol server 140 (FIG. 1).

The method 600 includes transferring a first nominal value to the particular data record using the real-time transfer protocol and a second nominal value to the particular data record using a non-real-time transfer protocol (step 610).

In at least some embodiments, the data to be transferred includes resource data. In these embodiments, the first nominal value and the second nominal value may include a small quantity of currency such as for example $0.01 and $0.02, respectively. The first nominal value and the second nominal value may be different values to avoid or minimize confusion. In embodiments where the data to be transferred includes computing resources, the first nominal value and the second nominal value may include a small quantity of computing resources.

To transfer the first nominal value to the particular record using the real-time transfer protocol, the server computer system 120 may generate a first data transfer request and communicate the data transfer request to the transfer protocol server 140. In embodiments where the real-time transfer protocol includes a real-time payment rail, the first transfer request may be formatted and encrypted as an ISO 20022 message and may include one or more parameters. The one or more parameters may be included as metadata in the data transfer request. The one or more parameters may include resource definition data that defines the nominal value. The first transfer request is sent to the transfer protocol server 140.

To transfer the second nominal value to the particular data record using the non-real-time transfer protocol, the server computer system 120 may generate a second data transfer request and communicate the second data transfer request to the transfer protocol server 140. In another embodiment, the second data transfer request may be communicated to a different server such as a third party server. The second data transfer request may be an e-transfer and as such the non-real-time transfer protocol may be associated with e-transfer. The second transfer request may be sent to the transfer protocol server 140.

Responsive to receiving the first and second data transfer request, the transfer protocol server 140 may attempt to complete the first data transfer request using the real-time payment rail and the second data transfer request using e-transfer.

The method 600 includes comparing a settlement time for the transfer of the first nominal value to a settlement time for the transfer of the second nominal value (step 620).

In this embodiment, the transfer protocol server 140 may send a first signal indicating confirmation of the first data transfer using the real-time transfer protocol and a second signal indicating confirmation of the second data transfer using e-transfer. The server computer system 120 may compare a time when the first signal was received to a time when the second signal was received. In another embodiment, the first and second signals may include information or data indicating settlement times for the first data transfer and the second data transfer, respectively. In this embodiment, the server computer system 120 may analyze the signals to extract the settlement times.

The method 600 includes determining that the settlement time for the first nominal value is before the settlement time for the second nominal value (step 630).

The server computer system 120 compares the settlement time for the first nominal value to the settlement time to determine that the first data transfer has settled before the second data transfer.

Responsive to determining that the settlement time for the first nominal value is before the settlement time for the second nominal value, the method 600 includes updating a database to indicate that the real-time protocol is available for an institution associated with the particular data record (step 640).

Responsive to determining that the settlement time for the first nominal value is before the settlement time for the second nominal value, the server computer system 120 may send a signal to the database 130 to update the database to indicate that the real-time protocol is available for the institution associated with the particular data record. In embodiments where the institution is not included in the database 130, the database 130 may update the data records to include the institution. As mentioned, in some embodiments the database may maintain a confidence score and as such the database may update the confidence score based on the signal indicating that the real-time protocol is available for the institution associated with the particular data record.

It will be appreciated that during method 600 it may be determined that the settlement time for the first nominal value is after the settlement time for the second nominal value, that the transfer of the first nominal value using the real-time transfer protocol has not completed within a threshold period of time and/or that a signal has been received from the transfer protocol server 140 indicating an error for the transfer of the first nominal value using the real-time transfer protocol. Responsive to one or more of these determinations, it may be determined that the real-time transfer protocol is not available for the institution. The database may be updated accordingly and this may be done in manners similar to step 640 described herein.

As described, the method 500 includes transferring a nominal value using the real-time transfer protocol to determine if the real-time transfer protocol is available for an institution and the method 600 includes transferring a first nominal value using the real-time transfer protocol and a second nominal value using a non-real-time transfer protocol to determine if the real-time transfer protocol is available for an institution. In one or more embodiments, the methods 500 and 600 may be selectively performed based on a score for a particular institution. For example, as mentioned, the database may include a lookup table that includes a score indicating a confidence as to whether or not an institution supports the real-time transfer protocol. The method 500 may be performed responsive to a determination that the score for a particular institution is above the threshold. Put another way, when it is determined that the particular institution is likely to support the real-time transfer protocol, the method 500 may be performed. The method 600 may be performed responsive to a determination that the score for a particular threshold is below the threshold. Put another way, when it is determined that the particular institution is not likely to support the real-time transfer protocol, the method 600 may be performed.

In one or more embodiments, in determining that the real-time transfer is available to complete the transfer, a method 700 may be performed. The method 700 may be performed, for example, when it is determined that the database does not have information regarding the particular institution associated with the data record. The method 700 may additionally or alternatively be performed periodically and/or randomly to ensure the database maintains an up-to-date list as to whether or not one or more particular institutions support one or more transfer protocols.

Figure 7:
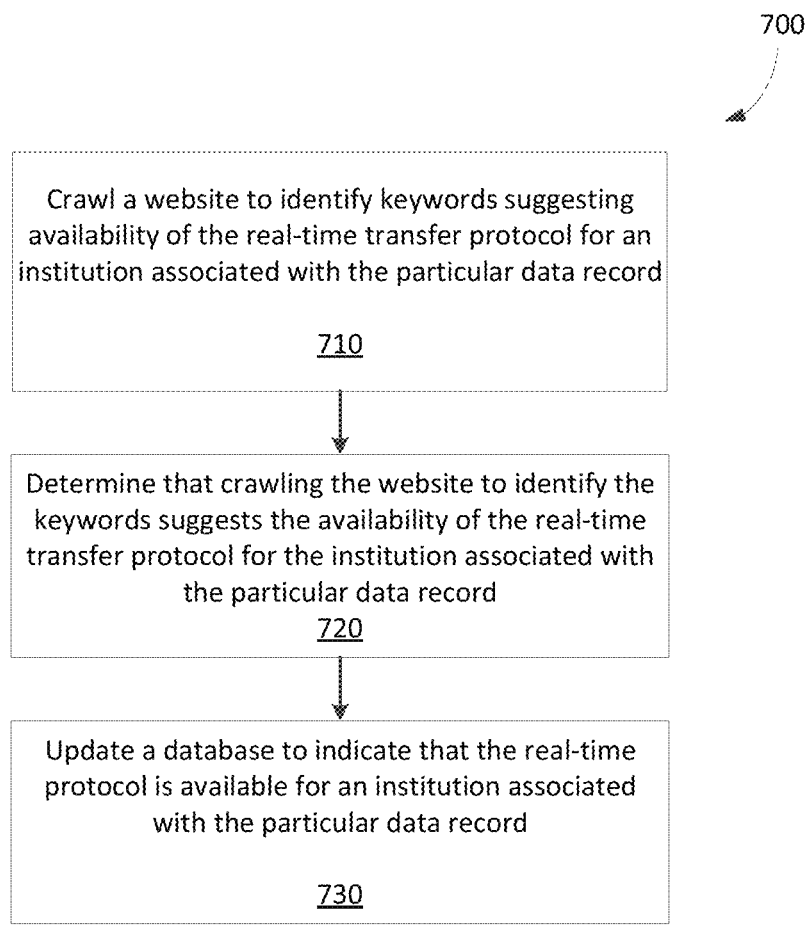
FIG. 7 shows, in flowchart form, another example method for determining real-time transfer protocol availability.

Reference is made to FIG. 7 which illustrates, in flowchart form, the method 700. The method 700 may be implemented by a computing device having suitable processor-executable instructions for causing the computing device to carry out the described operations. The method 700 may be implemented, in whole or in part, by the server computer system 120. The server computer system 120 may off-load some operations of the method 700 to the client device 110 and/or the transfer protocol server 140 (FIG. 1).

The method 700 includes crawling a website to identify keywords suggesting availability of the real-time transfer protocol for an institution associated with the particular data record (step 710).

In this embodiment, the server computer system 120 may engage a web crawling module and/or a web crawling API to crawl a website associated with the institution to identify keywords suggesting availability of the real-time transfer protocol. For example, a website may be identified that is associated with the institution and the web crawling module and/or the web crawling API may be engaged to analyze the website to determine if one or more keywords are present on the website that suggest availability of the real-time transfer protocol. Example keywords include "real-time", "real-time transfer", "real-time transfer rail", etc. It will be appreciated that in at least some embodiments the website may not be in the English language and as such the web crawling module and/or web crawling API may use language translation to identify the one or more keywords.

The method 700 includes determining that crawling the website to identify keywords suggests the availability of the real-time transfer protocol for the institution associated with the particular data record (step 720).

The server computer system 120 may receive a signal from the web crawling module and/or the web crawling API that indicates that crawling the website to identify keywords suggests the availability of the real-time transfer protocol for the institution. For example, the signal may include a binary response such as a "YES" that indicates that one or more of the keywords have been identified or may include a binary response such as a "NO" that indicates that one or more of the keywords have not been identified. In another example, the signal may include a count of keywords that have been identified. For example, crawling of the website may identify three (3) counts of the word "real-time transfer" and as such the signal may indicate that the keywords have been identified three (3) times on the website.

The method 700 includes updating a database to indicate that the real-time protocol is available for an institution associated with the particular data record (step 730).

Responsive to determining that crawling the website to identify keywords suggests the availability of the real-time transfer protocol for the institution associated with the particular data record, the server computer system 120 may send a signal to the database 130 to update the database to indicate that the real-time protocol is available for the institution associated with the particular data record. In embodiments where the institution is not included in the database 130, the database 130 may update the data records to include the institution. As mentioned, in some embodiments the database may maintain a confidence score and as such the database may update the confidence score based on the signal indicating that the real-time protocol is available for the institution associated with the particular data record. The confidence score may be updated based on the count of keywords identified. For example, in embodiments where only one (1) keyword has been identified the confidence score may be increased by one (1). In embodiments where three (3) keywords have been identified, the confidence score may be increased by two (2) or three (3).

It will be appreciated that one or more of the methods 500, 600 and 700 may be performed during step 330 of the method 300. The methods 500, 600 and/or 700 may only be performed, for example, when it is determined that the database does not have information regarding the particular institution associated with the data record. The methods 500, 600 and/or 700 may additionally or alternatively be performed periodically and/or randomly to ensure the database maintains an up-to-date list as to whether or not one or more particular institutions support one or more transfer protocols.

The method 300 includes, in response to determining that the real-time transfer protocol is available to complete the transfer, sending a signal enabling a selectable option on the user interface to complete the transfer using the real-time transfer protocol (step 340).

When it is determined that the real-time transfer protocol is available to complete the transfer, the server computer system 120 may send a signal to the client device 110 to update the user interface to indicate that the real-time transfer protocol is available. Specifically, the user interface may be updated to include a selectable option to complete the transfer using the real-time transfer protocol.

Figure 8:
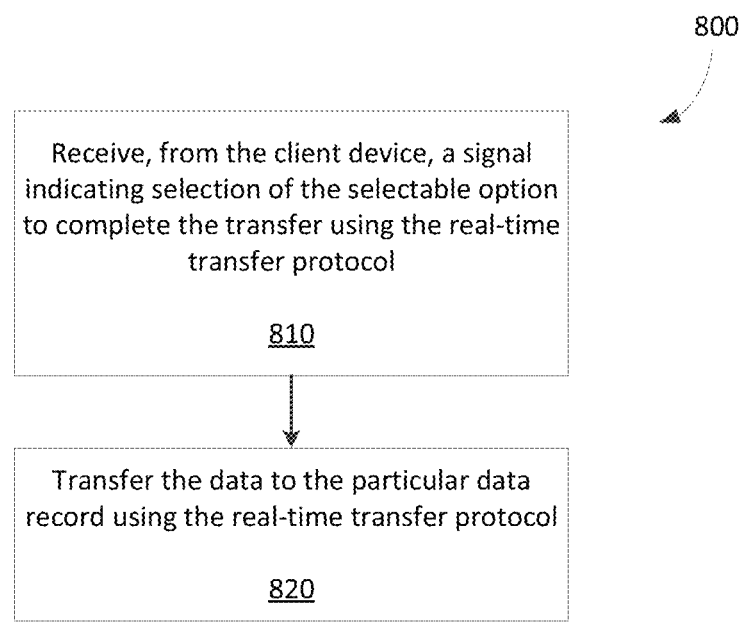
FIG. 8 shows, in flowchart form, an example method for completing a data transfer using a real-time transfer protocol.

The user may select the selectable option to complete the transfer using the real-time transfer protocol. Reference is made to FIG. 8, which illustrates, in flowchart form, a method 800 for completing the data transfer using the real-time transfer protocol. The method 800 may be implemented by a computing device having suitable processor-executable instructions for causing the computing device to carry out the described operations. The method 800 may be implemented, in whole or in part, by the server computer system 120. The server computer system 120 may off-load some operations of the method 800 to the client device 110 and/or the transfer protocol server 140 (FIG. 1).

The method 800 includes receiving, from the client device 110, a signal indicating selection of the selectable option to complete the transfer using the real-time transfer protocol (step 810).

In this embodiment, responsive to the user selecting the selectable option displayed on the client device 110, the client device 110 sends a signal indicating selection of the selectable option to complete the transfer using the real-time transfer protocol to the server computer system 120.

Responsive to receiving the signal indicating selection of the selectable option, the method 800 includes sending a signal to the transfer protocol server 140 to transfer the data to the particular data record using the real-time transfer protocol (step 820).

In this embodiment, the server computer system 120 may generate a data transfer request and communicate the data transfer request to the transfer protocol server 140. In embodiments where the real-time transfer protocol includes a real-time payment rail, the transfer request may be formatted and encrypted as an ISO 20022 message and may include one or more parameters. The one or more parameters may be included as metadata in the data transfer request. The one or more parameters may include resource definition data that defines the nominal value. The transfer request is sent to the transfer protocol server 140.

The data transfer request may be formatted as an ISO 20022 message and may include one or more parameters. The ISO 20022 format is a data-rich messaging format that provides the real-time data transfer rail with a clear and nuanced format of data. The one or more parameters may be included as metadata in the data transfer request. The one or more parameters may include resource definition data. The resource definition data defines what is requested to be transferred. By way of example, the resource definition data may define a resource that is stored in or otherwise associated with a data record associated with the sender. The resource may represent an amount of value, such as a quantity of a currency. Since the ISO 20022 format is a data-rich messaging format that provides the real-time data transfer rail with a clear and nuanced format of data, the likelihood of errors and thus processing delays is minimized and as a result the real-time payment rail is able to facilitate data transfers in real-time.

Responsive to receiving the data transfer request, the real-time payment system may complete the data transfer request using the real-time payment rail. Specifically, the real-time payment server is configured to receive the data transfer request and to facilitate the data transfer from a data record associated with the sender to the particular data record associated with the receiver in real-time. In at least some embodiment, the data transfer is irrevocable, that is, the sender cannot retrieve the data transfer after it has been sent.

The real-time payment rail is able to complete data transfer requests in real-time or near real-time. In at least some embodiments, real-time is defined as being within seconds. In at least some embodiments, real-time may be limited by network traffic.

It will be appreciated that the real-time payment rail is available 24×7×365, that is, twenty four (24) hours a day, seven (7) days a week, and three hundred and sixty five (365) days per year.

Figure 9:
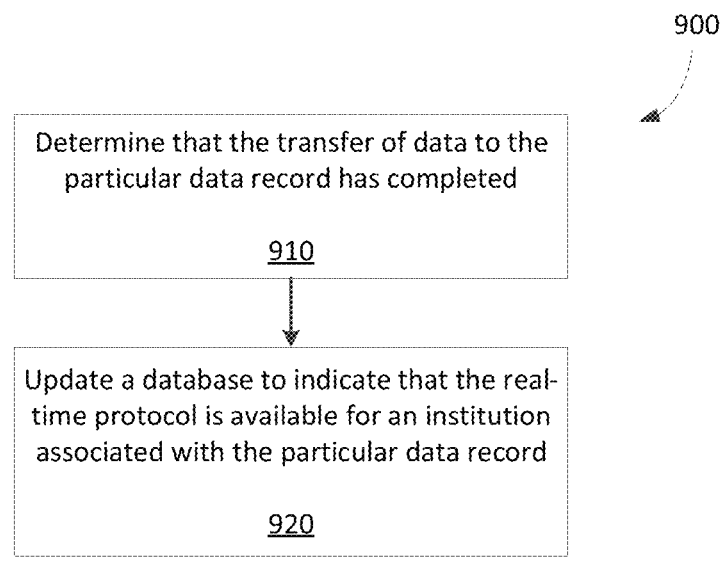
FIG. 9 shows, in flowchart form, an example method for updating a database.

Responsive to completion of the data transfer, the server computer system 120 may update the database 130. Reference is made to FIG. 9, which illustrates, in flowchart form, a method 900 for completing the data transfer using the real-time transfer protocol. The method 900 may be implemented by a computing device having suitable processor-executable instructions for causing the computing device to carry out the described operations. The method 900 may be implemented, in whole or in part, by the server computer system 120. The server computer system 120 may off-load some operations of the method 900 to the client device 110 and/or the transfer protocol server 140 (FIG. 1).

The method 900 includes determining that the transfer of the data to the particular data record has completed (step 910).

In this embodiment, the transfer protocol server 140 may send a signal indicating confirmation of the data transfer using the real-time transfer protocol. Since the real-time transfer protocol is able to complete data transfer requests in real-time or near real-time, the server computer system 120 is able to determine that the transfer of data to the particular data record using the real-time transfer protocol has completed in real-time or near real-time.

The method 900 includes updating a database to indicate that the real-time protocol is available for an institution associated with the particular data record (step 920).

Responsive to determining that the transfer of data to the particular data record using the real-time transfer protocol has completed, the server computer system 120 may send a signal to the database 130 to update the database to indicate that the real-time protocol is available for the institution associated with the particular data record. In embodiments where the institution is not included in the database 130, the database 130 may update the data records to include the institution. As mentioned, in some embodiments the database may maintain a confidence score and as such the database may update the confidence score based on the signal indicating that the real-time protocol is available for the institution associated with the particular data record.

In embodiments described herein a database is maintained that includes a list of institutions and an indication as to whether or not a real-time transfer protocol is available for the institution. The indication may include a binary response such as a "YES" or a "NO" and/or may include a confidence score which may be a number between zero (0) and ten (10). The database may be made available to one or more third party servers. For example, the database may be configured as an application programming interface (API) that may be configured to receive API requests from one or more third party servers and to generate responses to such requests. The requests may include a request as to whether or not a real-time transfer protocol is available for a particular institution. In at least some embodiments, the requests may include a request as to whether a real-time payment rail is available for a particular institution. The database may be continuously and/or periodically updated in manners similar to embodiments described herein.

Figure 10:
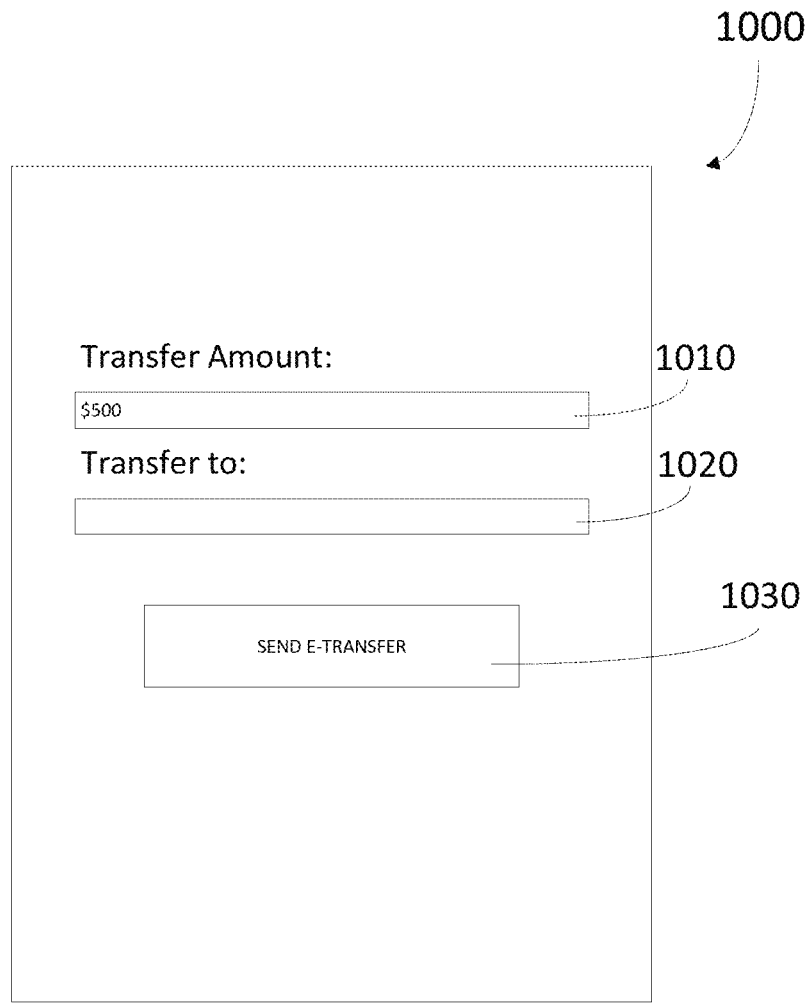
FIG. 10 shows an example user interface.

Turning to FIG. 10, an example user interface 1000 is shown. The user interface 1000 may be a user interface associated with initiating a data transfer request using, for example, a non-real-time transfer protocol. The user interface 1000 includes a first input field 1010 associated with a transfer amount and a second input field 1020 associated with identifying a recipient. The user interface 1000 includes a selectable option 1030 that, when selected, initiates a transfer of data using a non-transfer protocol.

Figure 11:
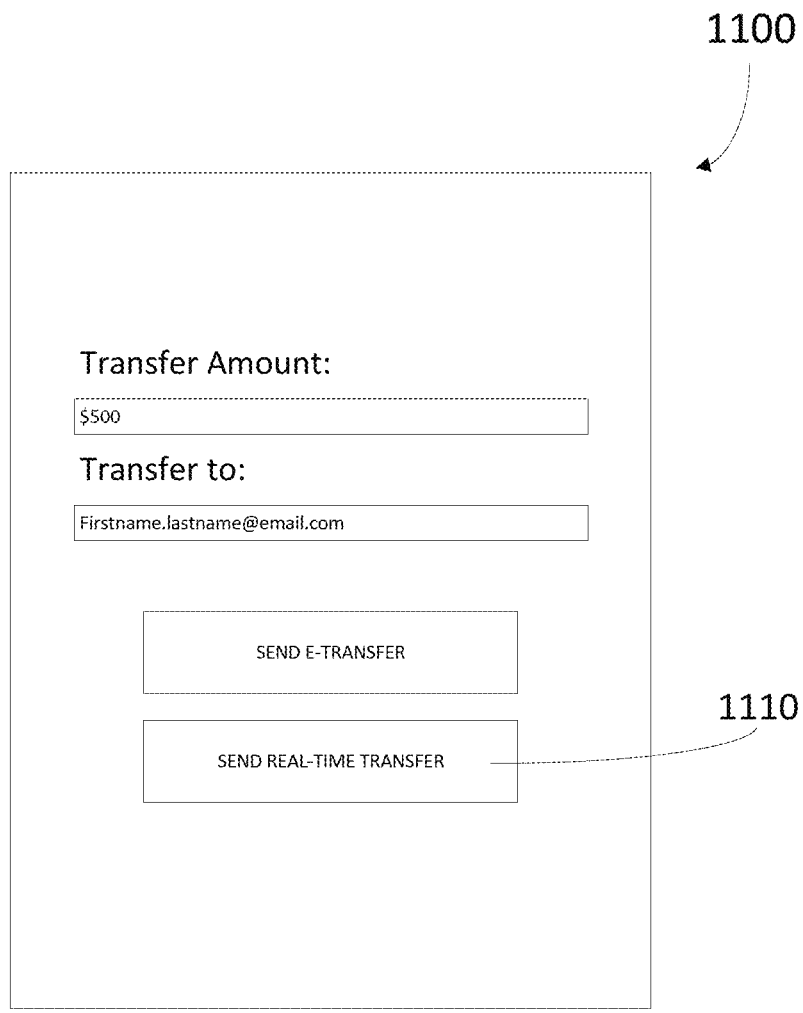
FIG. 11 shows another example user interface.

The server computer system 120 may perform operations as described herein to determine if the real-time transfer protocol is available for a particular institution. As mentioned, responsive to determining that the real-time transfer protocol is available, the server computer system 120 may send a signal to update the user interface. An example updated user interface 1100 is shown in FIG. 11. The user interface 1100 is similar to user interface 1000 with the addition of a selectable option 1110 associated with completing a data transfer using the real-time transfer protocol. The selectable option 1110 may be displayed in response to the server computer system 120 determining that the real-time transfer protocol is available and this may be done using the email address used to identify the recipient in accordance with embodiments described herein.

The various embodiments presented above are merely examples and are in no way meant to limit the scope of this application. Variations of the innovations described herein will be apparent to persons of ordinary skill in the art, such variations being within the intended scope of the present application. In particular, features from one or more of the above-described example embodiments may be selected to create alternative example embodiments including a sub-combination of features which may not be explicitly described above. In addition, features from one or more of the above-described example embodiments may be selected and combined to create alternative example embodiments including a combination of features which may not be explicitly described above. Features suitable for such combinations and sub-combinations would be readily apparent to persons skilled in the art upon review of the present application as a whole. The subject matter described herein and in the recited claims intends to cover and embrace all suitable changes in technology.

What is claimed is:

1. A server computer system, comprising:
   a processor;
   a communications module coupled to the processor; and
   a memory coupled to the processor, the memory storing instructions that, when executed, configure the processor to:
   determine that a real-time transfer protocol is available to complete a transfer by consulting a database that is updated to indicate that the real-time transfer protocol is available at least when it is determined that a transfer successfully completed using the real-time transfer protocol; and
   in response to determining that the real-time transfer protocol is available to complete the transfer, send, to a client device, a signal enabling a selectable option on a user interface to complete the transfer using the real-time transfer protocol.

2. The server computer system of claim 1, wherein the instructions, when executed, further configure the processor to:
   receive, from the client device, a signal indicating selection of the selectable option to complete the transfer using the real-time transfer protocol; and
   responsive to receiving the signal indicating selection of the selectable option to complete the transfer using the real-time transfer protocol, transfer the data using the real-time transfer protocol.

3. The server computer system of claim 2, wherein the instructions, when executed, further configure the processor to:
   determine that the transfer of the data using the real-time transfer protocol has completed; and
   responsive to determining that the transfer of the data using the real-time transfer protocol has completed, update the database to indicate that the real-time transfer protocol is available.

4. The server computer system of claim 1, wherein determining that the real-time transfer protocol is available to complete the transfer includes sending, to the database, a signal requesting confirmation that the real-time transfer protocol is available to complete the transfer.

5. The server computer system of claim 1, wherein determining that the real-time transfer protocol is available to complete the transfer includes transferring a nominal value using the real-time transfer protocol and monitoring the transfer of the nominal value using the real-time transfer protocol for completion.

6. The server computer system of claim 5, wherein the instructions, when executed, further configure the processor to:
determine that the transfer of the nominal value using the real-time transfer protocol has completed; and
responsive to determining that the transfer of the nominal value using the real-time transfer protocol has completed, update the database to indicate that the real-time transfer protocol is available.

7. The server computer system of claim 1, wherein determining that the real-time transfer protocol is available to complete the transfer includes transferring a first nominal value using the real-time transfer protocol and transferring a second nominal value using a non-real-time transfer protocol and comparing a settlement time for the transfer of the first nominal value to a settlement time for the transfer of the second nominal value.

8. The server computer system of claim 7, wherein the instructions, when executed, further configure the processor to:
determine that the settlement time for the first nominal value is before the settlement time for the second nominal value; and
responsive to determining that the settlement time for the first nominal value is before the settlement time for the second nominal value, update the database to indicate that the real-time transfer protocol is available.

9. The server computer system of claim 1, wherein determining that the real-time transfer protocol is available to complete the transfer includes crawling a website to identify keywords suggesting availability of the real-time transfer protocol.

10. The server computer system of claim 9, wherein the instructions, when executed, further configure the processor to:
determine that crawling the website to identify the keywords suggests the availability of the real-time protocol; and
responsive to determining that crawling the website to identify the keywords suggests the availability of the real-time transfer protocol, update the database to indicate that the real-time transfer protocol is available.

11. The server computer system of claim 1, wherein the database maintains a score for one or more institutions indicating a confidence that the real-time transfer protocol is available for the one or more institutions.

12. A method comprising:
determining that a real-time transfer protocol is available to complete a transfer by consulting a database is updated to indicate that the real-time transfer protocol is available at least when it is determined that a transfer successfully completed using the real-time transfer protocol; and
in response to determining that the real-time transfer protocol is available to complete the transfer, sending, to a client device, a signal enabling a selectable option on a user interface to complete the transfer using the real-time transfer protocol.

13. The method of claim 12, further comprising:
receiving, from the client device, a signal indicating selection of the selectable option to complete the transfer using the real-time transfer protocol; and
responsive to receiving the signal indicating selection of the selectable option to complete the transfer using the real-time transfer protocol, transferring the data using the real-time transfer protocol.

14. The method of claim 13, further comprising:
determining that the transfer of the data using the real-time transfer protocol has completed; and
responsive to determining that the transfer of the data using the real-time transfer protocol has completed, updating the database to indicate that the real-time transfer protocol is available.

15. The method of claim 12, wherein determining that the real-time transfer protocol is available to complete the transfer includes sending, to the database, a signal requesting confirmation that the real-time transfer protocol is available to complete the transfer.

16. The method of claim 12, wherein determining that the real-time transfer protocol is available to complete the transfer includes transferring a nominal value to using the real-time transfer protocol and monitoring the transfer of the nominal value using the real-time transfer protocol for completion.

17. The method of claim 16, further comprising:
determining that the transfer of the nominal value using the real-time transfer protocol has completed; and
responsive to determining that the transfer of the nominal value using the real-time transfer protocol has completed, updating the database to indicate that the real-time transfer protocol is available.

18. The method of claim 12, wherein determining that the real-time transfer protocol is available to complete the transfer includes transferring a first nominal value using the real-time transfer protocol and transferring a second nominal value using a non-real-time transfer protocol and comparing a settlement time for the transfer of the first nominal value to a settlement time for the transfer of the second nominal value.

19. The method of claim 18, further comprising:
determining that the settlement time for the first nominal value is before the settlement time for the second nominal value; and
responsive to determining that the settlement time for the first nominal value is before the settlement time for the second nominal value, updating the database to indicate that the real-time transfer protocol is available.

20. The method of claim 12, wherein determining that the real-time transfer protocol is available to complete the transfer includes crawling a website to identify keywords suggesting availability of the real-time transfer protocol.

21. The method of claim 20, further comprising:
determining that crawling the website to identify the keywords suggests the availability of the real-time transfer protocol; and
responsive to determining that crawling the website to identify the keywords suggests the availability of the real-time transfer protocol, updating the database to indicate that the real-time transfer protocol is available.

22. The method of claim 12, wherein the database maintains a score for one or more institutions indicating a confidence that the real-time transfer protocol is available for the one or more institutions.

23. A non-transitory computer readable storage medium comprising processor-executable instructions which, when executed, configure a processor to:
determine that a real-time transfer protocol is available to complete a transfer by consulting a database that is updated to indicate that the real-time transfer protocol is available at least when it is determined that a transfer successfully completed using the real-time transfer protocol; and in response to determining that the real-time transfer protocol is available to complete the transfer, send, to a client device, a signal enabling a selectable option on a user interface to complete the data transfer using the real-time transfer protocol.

* * * * *